United States Patent [19]

Searle

[11] 4,067,515
[45] Jan. 10, 1978

[54] HANG GLIDER

[76] Inventor: Thomas C. Searle, 249 Parker St., Acton, Mass. 01720

[21] Appl. No.: 671,246

[22] Filed: Mar. 29, 1976

[51] Int. Cl.² .............................................. B64C 31/02
[52] U.S. Cl. ................................. 244/16; 244/DIG. 1
[58] Field of Search ................ 244/16, 138 R, 153 R, 244/DIG. 1; D12/71

[56] References Cited
U.S. PATENT DOCUMENTS 3,936,012  2/1976  Murray .................................. 244/16

Primary Examiner—Trygve M. Blix
Assistant Examiner—Barry L. Kelmachter
Attorney, Agent, or Firm—Wolf, Greenfield & Sacks

[57] ABSTRACT

A kite-like device used by an individual for gliding or soaring through the air usually commencing from a high elevation such as a mountain top. The glider comprises a pair of leading members and a keel interconnected by a nose plate, a cross member extending between the leading members, a control frame structure hanging from the keel, a king post for supporting tie wires or cables and a fabric such as Dacron secured to the leading members and keel. The cross member is pinned at its ends to the leading members and it is hinged at its center to permit the cross member and in turn the leading members to fold toward the keel to thereby make the glider easier to carry or transport.

22 Claims, 10 Drawing Figures

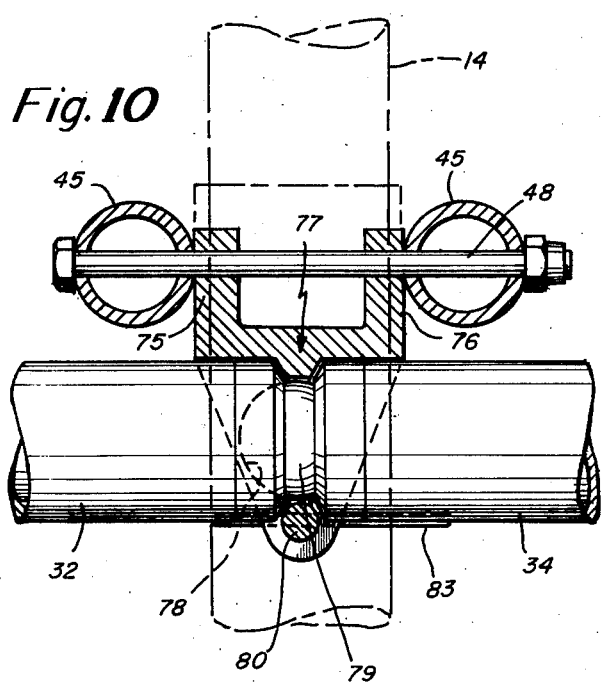
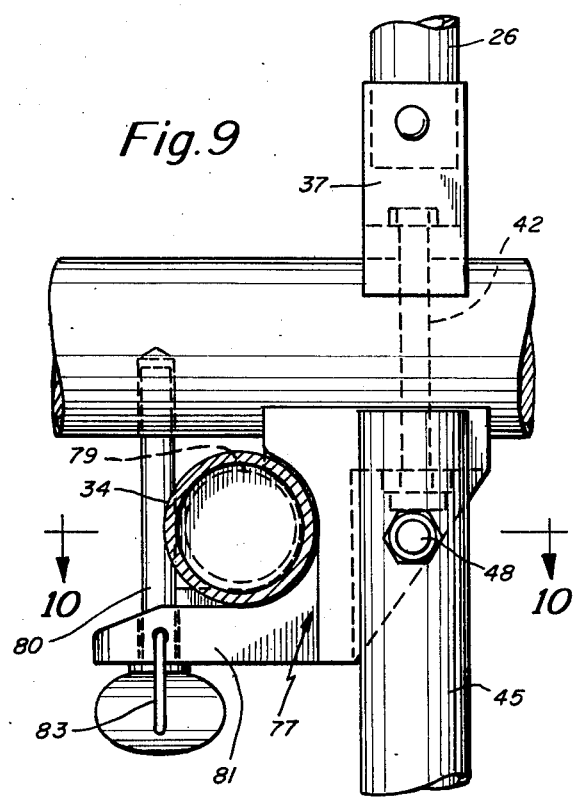

HANG GLIDER

BACKGROUND OF THE INVENTION

The present invention relates to kite-like gliders which have become more popular recently and are referred to as hang gliders. These gliders comprise a number of elongated members which form a frame over which a fabric material such as Dacron is extended. Typically, a person climbs a hill or mountain to a suitable elevated location and there assembles the glider, usually attaching the ends of the cross member to the leading members and connecting tie wires from the king post and the control frame to the ends of the cross member. Once the glider is assembled the person attaches himself to the glider, usually by means of a harness. He then accomplishes take-off by propelling himself and the glider down the slope into the wind, and glides to a landing place at a lower elevation.

One of the undesirable features of this sport is that the glider is relatively combersome to carry or transport when assembled and usually a number of inconvenient disconnections are necessary in order to dismantle the glider into a configuration wherein it can be easily carried. Furthermore, after the glider has been transported the reverse process of reconnection is also quite cumbersome.

Accordingly, one object of the present invention is to provide a hang glider that is readily foldable so that it can be more easily carried.

A further object of the present invention is to provide a hang glider that is readily and conveniently converted from an operational configuration to a transport configuration and vice versa.

Another object of the present invention is to provide a hang glider having a cross member assembly that pivotally connects to a pair of respective leading members at the outer ends of the cross member assembly and wherein the cross member assembly also hinges preferably at its mid-point to permit the cross member assembly to fold thereby also permitting the leading members to fold toward the keel of the hang glider, yet without requiring prior disconnection at the ends of the cross member.

A further object of the present invention is to provide a hang glider of improved construction, that is easily foldable, that is durable in construction, that is relatively light in weight, and that can be easily reassembled for use after being transported.

SUMMARY OF THE INVENTION

To accomplish the foregoing and other objects of this invention the hang glider comprises a pair of leading members, a keel member, and means which may be in the form of a nose plate for securing one end of each of the leading members and keel member together. The leading members are pivotally secured to the nose plate and when opened form a V-shape between the keel member and respective leading members. The keel is preferably fixed to the nose plate and does not pivot relative to it. A control frame is also provided and is secured in a hanging position by the keel. Pin means or the like are provided for pivotally securing the ends of the cross member assembly to the respective leading members. The cross member assembly comprises a pair of cross member parts interconnected by a hinge means permitting folding of the cross member assembly and in turn rotation of the leading members about their secured ends toward the keel. The hang glider also includes a number of tie wires which connect between the various members of the device for supporting these different members in the proper space position relative to each other. A fabric means which may include a Dacron fabric covers the glider and may be secured, for example, to the leading members and keel.

In both the folded configuration of the glider and the flight configuration of the glider the outer ends of the cross member assembly are pivotally secured to the leading members. To unfold the glider when it is to be used, the cross member parts are moved to an in-line relationship thereby moving the leading members away from the keel member. A securing means is provided for locking the center of the cross member to the keel so that the cross member assembly cannot be hinged and the relative positions of the leading members, keel member and cross member parts cannot change during the flight of the glider.

BRIEF DESCRIPTION OF THE DRAWINGS

Numerous other objects, features and advantages of this invention should now become apparent upon a reading of the following detailed description taken in conjunction with the accompanying drawings, in which:

FIG. 9 is a view similar to that shown in FIG. 6 for an alternate embodiment in accordance with this invention; and FIG. 10 is a view partially in cross section and taken along lines 10—10 of FIG. 9.

DETAILED DESCRIPTION

Figure 1:
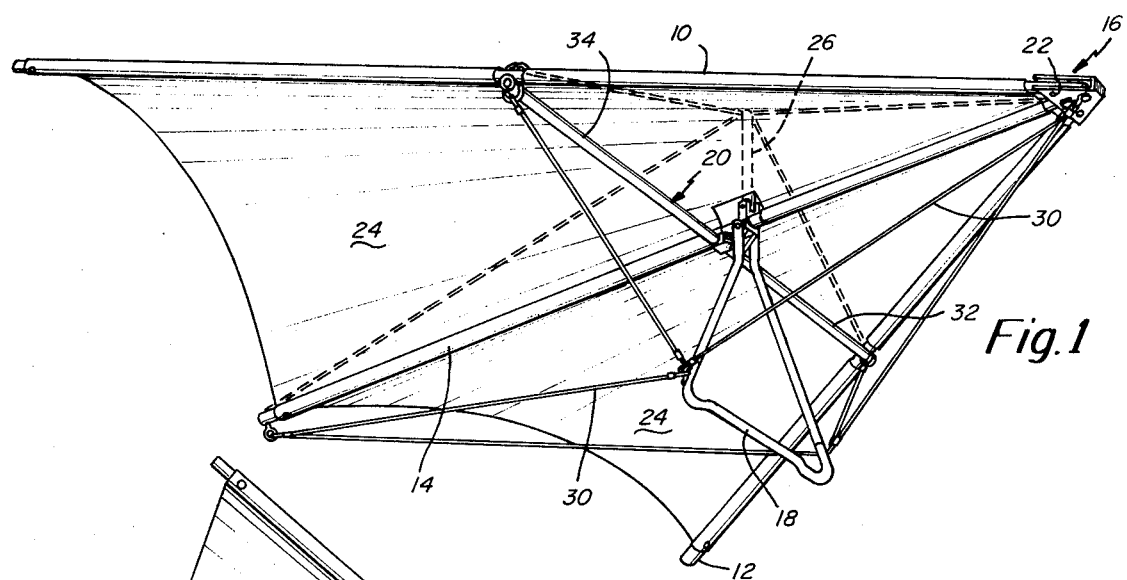
FIG. 1 is a perspective view showing a hang glider constructed in accordance with the principles of this invention.
Figure 2:
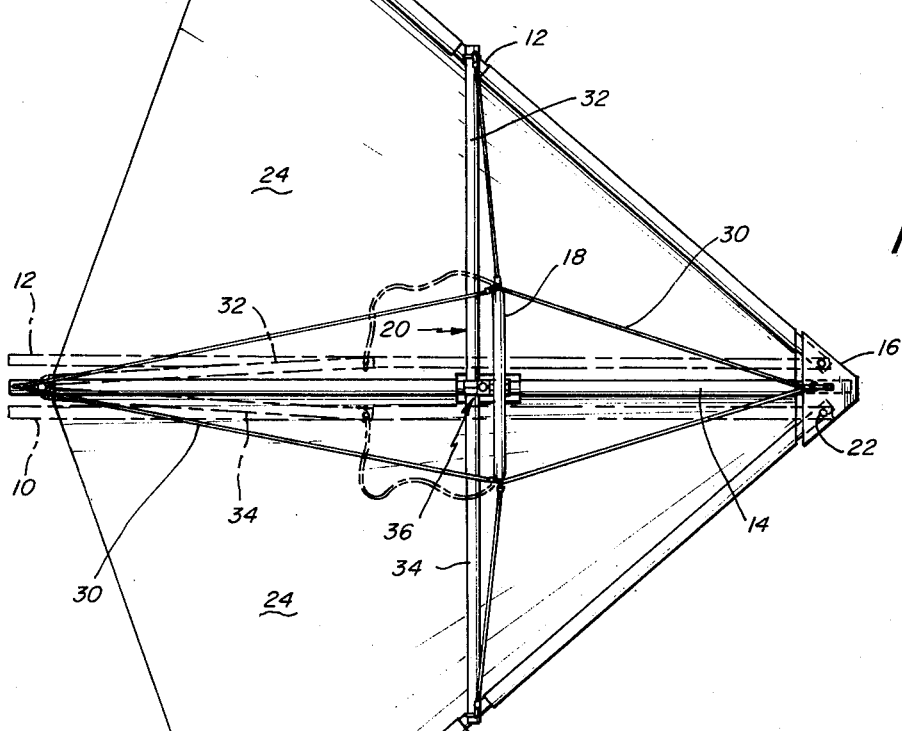
FIG. 2 is a bottom view of the glider shown in FIG. 1 and also showing, in phantom, the glider in a folded position.
Figure 3:
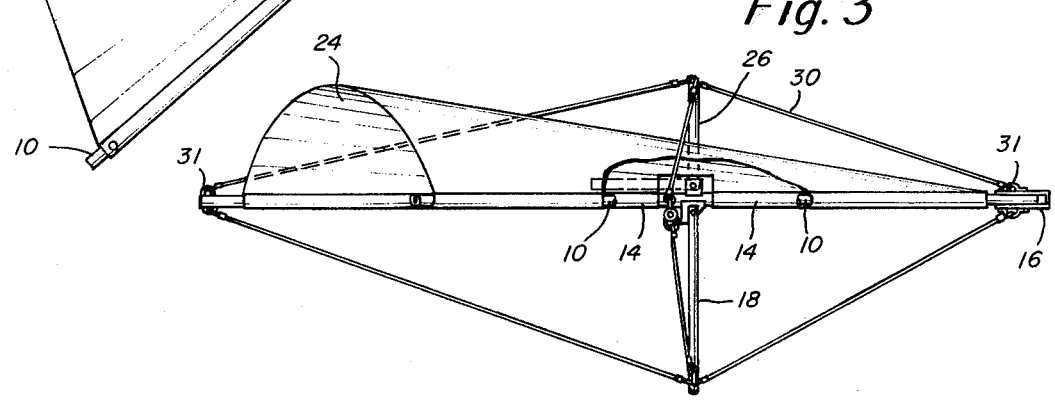
FIG. 3 is a side elevational view of the glider.

Referring now to the drawings and in particular to FIGS. 1-3, the hang glider comprises leading members 10 and 12, keel member 14, nose bracket 16, control frame 18, and cross member assembly 20. Each of these members with the exception of bracket 16 may be constructed of a metallic tubular material. Nose bracket 16 receives one end of each of the members 10, 12 and 14 and members 10 and 12 are pivotally supported in the bracket 16 by means of pins 22.

Additional support means is provided for the structure including a king post 26 supported from the keel 14 and a plurality of tie wires 30. These tie wires 30 connect from the control frame 18 to the keel 14, cross member assembly 20, and nose bracket 16. Additional tie wires 30 also connect from the king post 26 to the ends of the cross member assembly, to the nose bracket 16 and to the keel 14. The tie wires 30 may be connected in a well known manner. For example, FIG. 3 shows one of the wires 30 coupling to the nose bracket 16 by means of an eyelet 31. A similar eyelet 31 is provided at the end of the keel member 14. A further tie wire 30 is connected to this eyelet 31 as shown in FIG. 3.

The cross member assembly 20 comprises cross member parts 32 and 34, and a hinge means 36. FIG. 2 shows the parts 32 and 34 in-line when the glider is open for use. FIG. 2 also shows in phantom the parts 32 and 34 folded so as to at least partially fold the glider. The parts 32 and 34 hinge means 36 comprise a toggle joint.

Figure 4:
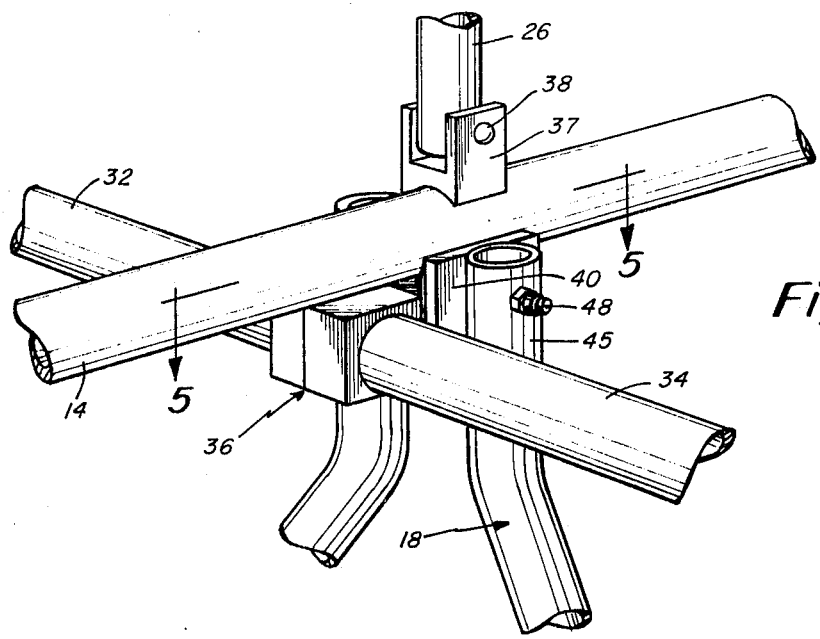
FIG. 4 is a fragmentary perspective view showing a portion of the hang glider including a portion of the hinged cross member assembly.
Figure 5:
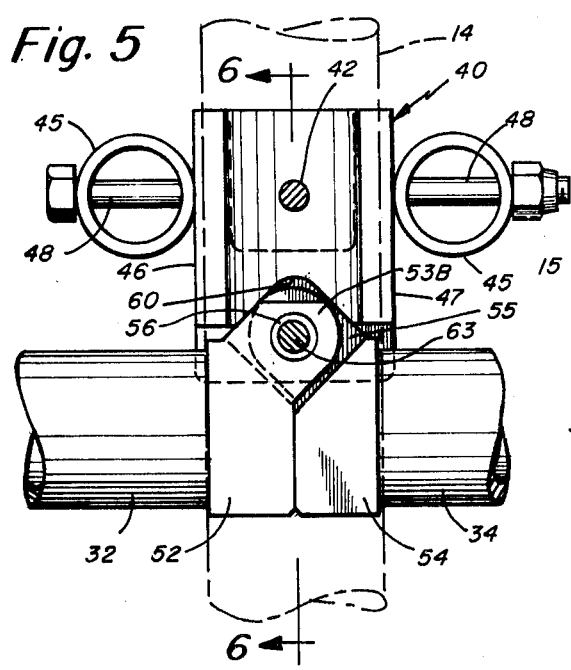
FIG. 5 is a cross-sectional view taken along line 5—5 of FIG. 4.
Figure 6:
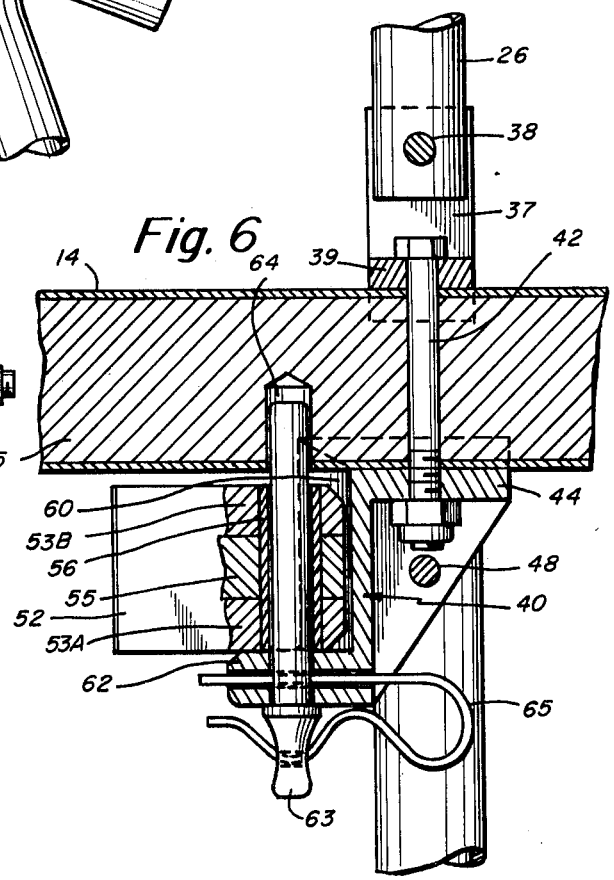
FIG. 6 is a cross-sectional view taken along lines 6—6 of FIG. 5.

Referring now to FIGS. 4–7 there is shown somewhat more detail regarding the hinging of the cross member assembly and also the securing of the cross member assembly in the flight position of the glider. FIGS. 4 and 6 show the king post 26 which is supported from a U-shaped bracket 37. The king post 26 is secured to the bracket 37 in a pivotal manner by means of a rivet or pin 38. The bracket 37 has an arcuate bottom that conforms to the shape of the keel 14. Similarly, the support member 40 has an arcuate top surface that conforms to the shape of the keel 14. Both the bracket 37 and the support member 40 are secured to the keel by means of a bolt 42 as clearly shown in FIG. 6. This bolt passes through a hole in the base 39 of the bracket 37, passes through a solid supporting core 15 within the keel 14 and also passes through a hole in roof 44 of the support member 40.

The control frame 18 is supported from the support member 40 which is in turn supported from the keel 14. The control frame 18 includes upper cylindrical sections 45 which are disposed essentially in parallel to each other touching the opposing walls 46 and 47 of the support member 40 as shown in FIG. 5. An elongated pin or rivet 48 passes through one of the sections 45 as shown in FIG. 5, passes through the walls 46 and 47 and also passes through the other opposite section 45. The pin 48 permits some pivotal motion of the control frame 18 relative to the keel 14.

Figure 7:
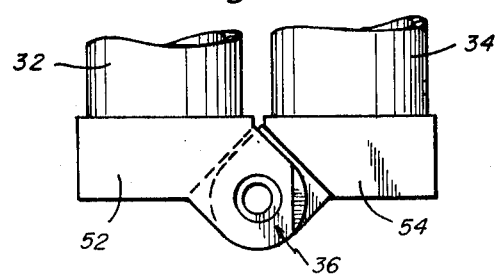
FIG. 7 is a partial view showing a portion of the cross member assembly in a completely folded position.

The hinge means 36 comprises hinge blocks 52 and 54 which may be integrally formed with the parts 32 and 34, respectively. One of the blocks such as block 52 has a bifurcated end defined by legs 53A and 53B and the other block 54 has one central leg 55 which is interdigitally arranged with the legs 53A and 53B as shown in FIG. 6. A hollow pin 56 is fitted to apertures in the legs 53A, 53B and 55 thus maintaining these parts in alignment permitting relative rotation between the blocks 52 and 54 such as to the position shown in FIG. 7. FIG. 7 shows a fragmentary view of the hinge means such as when it is in the position shown in phantom in FIG. 2.

It is noted that in the position such as is shown in FIG. 5 that the hollow pin 56 which defines the pivot point is out of line with the center line of the parts 32 and 34. In this way substantially 180° relative rotation is permitted between the parts 32 and 34. Further, the legs 53A, 53B and 55 are shaped as shown in FIG. 5 with an arcuate configuration that fits within the recess 60 defined in the support member 40. The support member 40 with its recess 60 is thus a registration member while the arcuate shape of the legs forms an indexing member. FIG. 6 shows these parts within the recess 60 with one of the blocks resting upon the platform 62 which also forms a part of the support member 40. FIG. 6 shows a means for securing the hinge means to the support member 40 comprising a pin 63 which passes through the hollow pin 56 and a hole in the platform 62. Pin 63 also passes into a further hole 64 in the core 15 of the keel. A locking pin 65 is used for securing the pin 63 in place. This locking pin 65 passes through a passage in the leg 62 and also a passage through the pin 63 and prevents the pin 63 from being withdrawn from the glider.

FIGS. 1–3 show a durable fabric 24 which covers the glider and may be secured by suitable means to the keel 14 and also to the leading members 10 and 12. The fabric 24 may be a Dacron fabric that is looped about the cylindrical members and sewed in place.

Figure 8:
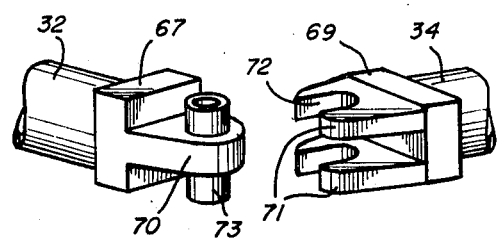
FIG. 8 is a perspective view showing a portion of an alternate embodiment of a cross member assembly.

FIG. 8 is a perspecitve fragmentary view showing an alternate embodiment for the hinge means. This structure could be used in association with a support member similar to the one shown in FIG. 6. Thus, the parts 32 and 34 have affixed at their end hinge blocks 67 and 69, respectively. Block 67 has a central leg 70 extending therefrom and block 69 has legs 71 extending therefrom. Each of the legs 71 has a cut-out 72 for accommodating the hollow pivot pin 73 supported in leg 70. The arrangement shown in FIG. 8 is unlike that shown in FIG. 6 because the two parts 32 and 34 are not maintained always interlocked. The parts 32 and 34, however, are interlocked with the pivot pin 73 fitting within the passages 72 when the parts 32 and 34 are in an engaged position such as the one shown in FIG. 5. A pin like the pin 63 may then be passed through the hollow pin 73 for maintaining the center of the cross member assembly in a fixed position relative to the keel.

In FIGS. 9 and 10 like reference characters will be used to identify parts similar to those shown in FIGS. 4–7. Thus, in FIGS. 9 and 10 there is shown the parts 32 and 34, the pin 48, the keel 14, the bracket 37, the king post 26, and the support bolt 42. The pin 48 again is for supporting the control frame 18 and passes through the ends 45 of the control frame and also through the walls 75 and 76 of the support member 77. The support member 77 shown in FIGS. 9 and 10 is of a slightly different configuration than the member 40 shown in FIG. 6.

The part 32 has an end defined by a concave spherical recess 78. The part 34 has a convex spherical end 79 that mates with the recess 78. As with the embodiment shown in FIG. 8, in the embodiment of FIGS. 9 and 10 the longitudinal forces from the tie wires along parts 32 and 34 as they are swing into a flight position ensures engagement of the parts 32 and 34. Thus, these parts cannot separate in a longitudinal direction while in a flight position. In the embodiment of FIGS. 9 and 10 a pin 80 is used to fix the parts 32 and 34 relative to the keel member. This pin 80 passes through an aperture in platform 81 and also fits within a recess in the keel 14 which may be a solid as shown in FIG. 6. The pin 80 and a raised portion of member 77, as shown in FIG. 10, engages a groove defined between the beveled shoulders of the parts 32 and 34. The pin 80 is maintained in place by means of a locking pin 83. Thus, the center or mid-point of the cross member assembly is fixed relative to the keel.

Having described a limited number of embodiments of the present invention it should now be apparent to those skilled in the art that there are numerous modifications of these embodiments that can be made all of which are contemplated as falling within the scope of this invention. For example, FIG. 6 has shown one type of pinning arrangement and FIG. 9 has shown a somewhat similar arrangement. Obviously, other types of pinning or securing arrangements can be used for maintaining the center of the cross member assembly in a secured fixed position relative to the keel. The present invention may be practiced in the manner shown in FIGS. 4–7 wherein the parts 32 and 34 are always maintained affixed together but relatively pivotal. Alternatively, the embodiments shown in FIGS. 8–10 permit the parts 32 and 34 to be disconnected whtn the glider is in its transport position. Further, the hinge means need not be secured directly to the keel member. The hinge means may even be off-center on the cross member assembly in which case one of the cross member parts is secured to the keel by suitable means such as shown herein.

What is claimed is:

1. A hang glider comprising;
a pair of leading members,
a keel member,
means pivotally securing one end of each of said leading members and keel member together at a common place to form a V-shape between the keel member and respective leading members,
a control frame,
a cross member assembly,
means for securing the control frame in a hanging position from the keel member,
means for pivotally securing the ends of the cross member assembly to the respective leading members,
fabric means mounted to the leading members and keel member,
said cross member assembly having at least a folded position and an extended position and portions forming a toggle joint means,
and means associated with the keel member for receiving a predetermined point of the cross member assembly when in the extended position to thereby releasably retain the cross member assembly in the extended position,
said cross member assembly adapted to fold and move away from the means for receiving with the ends of the cross member assembly secured to the leading members approaching each other as the leading members rotate about their secured ends toward the keel member.

2. A hang glider as set forth in claim 1 further comprising means including tie wires for supporting the ends of the keel member and cross member assembly.

3. A hang glider as set forth in claim 2 wherein the control frame is pivotally secured to the keel member.

4. A hang glider as set forth in claim 3 wherein said means for supporting includes a king post secured to the keel member above the control frame.

5. A hang glider as set forth is claim 1 wherein said means for receiving comprises a support member secured to the keel member.

6. A hang glider as set forth in claim 1 wherein said toggle joint means comprises two cross member parts of said cross member assembly which interface and interact with each other end to end to form a joint.

7. A hang glider as set forth in claim 6 wherein said cross member parts have mating ends that interdigitally mate with each other pivot means interconnecting the ends and permitting relative rotation between the parts.

8. A hang glider as set forth in claim 6 including tie wires for supporting the ends of the keel member and cross member assembly and wherein said cross member parts are disconnectable.

9. A hang glider as set forth in claim 6 wherein said cross member parts have interdigitally mating ends that are joined to each other by a pivot pin passing through said mating ends to tie the cross member parts together and yet permit hinging movement therebetween.

10. A hang glider as set forth in claim 9 wherein said pivot pin is hollow defining a passage therethrough and further comprising a locking pin passing through the passage in the pivot pin and also engaging at least one of the keel member and said means for receiving.

11. A hang glider as set forth in claim 6 including tie wires for supporting the ends of the keel member and cross member assembly and wherein said cross member parts have mating interfacing ends which are separable but which form the joint when held in mating relationship as when the cross member assembly is moved to its extended position.

12. A hang glider as set forth in claim 11 wherein said mating ends comprise a ball and socket joint.

13. A hang glider as set forth in claim 6 wherein said joint is offset from the center lines of said cross member parts.

14. A hang glider as set forth in claim 6 wherein said means for receiving includes a registration means and said joint comprises a single joint defining an indexing means for registration with the registration means.

15. A hang glider as set forth in claim 1 wherein said cross member assembly includes a pair of cross member parts having ends that are interdigitally mated with each other.

16. A hang glider as set forth in claim 1 wherein said means for receiving includes a registration means and said cross member assembly has an indexing means adapted for registration with the registration means when the cross member assembly is in its extended position.

17. A hang glider as set forth in claim 16 wherein said registration means comprises a support member with a notch for receiving the indexing means.

18. A hang glider as set forth in claim 17 wherein said notch in said support member is tapered for the purpose of homing the cross member assembly relative to the keel member.

19. A hang glider as set forth in claim 16 wherein said indexing means is positioned at the midpoint along the cross member assembly.

20. A hang glider as set forth in claim 1 wherein said toggle joint means comprises cross member parts jointedly interconnected by a single joint whereby movement of the joint in a direction longitudinal of the keel member causes the cross member parts to pivot relative to the leading members and to force the leading members toward or away from the keel member until the cross member assembly reaches its folded or extended position, respectively.

21. A hang glider as set forth in claim 1 wherein said means for receiving includes locking means for releasably retaining the cross member assembly relative to the keel member.

22. A hang glider as set forth in claim 21 wherein said locking means includes a locking pin and associated means for releasably retaining the locking pin in place.

* * * * *